Figure 1:
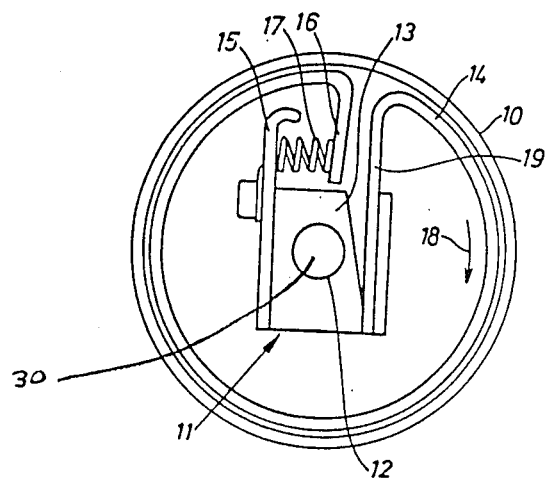

United States Patent [19]

Rangert et al.

[11] Patent Number: 4,813,525
[45] Date of Patent: Mar. 21, 1989

[54] CENTRIGUGAL CLUTCH

[75] Inventors: Bo R. Rangert, Mölnlycke; Karl-Gustav O. Wahlstrand, Onsla, both of Sweden

[73] Assignee: Aktiebolaget Electrolux, Sweden

[21] Appl. No.: 180,597

[22] Filed: Apr. 6, 1988

Related U.S. Application Data

[63] Continuation of Ser. No. 836,302, Mar. 5, 1986, abandoned.

[30] Foreign Application Priority Data

Mar. 11, 1985 [SE] Sweden ............................... 8501180

[51] Int. Cl.⁴ ............................................. F16D 41/20
[52] U.S. Cl. ..................................... 192/415; 192/77; 192/105 BA
[58] Field of Search .................. 192/77, 41 S, 105 BA

[56] References Cited

U.S. PATENT DOCUMENTS

| 259,199 | 6/1882 | Osborn | 192/77 |
|---|---|---|---|
| 452,162 | 5/1891 | Brown | 192/77 |
| 553,963 | 2/1896 | Heath et al. | 192/77 |
| 834,936 | 11/1906 | Robinson | 192/77 |
| 1,304,426 | 5/1919 | Welch | 192/77 |
| 2,320,082 | 5/1943 | Kupkake | 192/77 |
| 4,008,624 | 2/1977 | Van Dest | 192/53 H |
| 4,059,177 | 11/1977 | Lang | 192/415 |
| 4,217,976 | 8/1980 | De Jong | 192/80 |
| 4,239,095 | 12/1980 | De Jong | 192/48.3 |
| 4,271,948 | 6/1981 | Yeu | 192/847 |
| 4,276,963 | 7/1981 | Anderson | 192/70 |

Primary Examiner—David A. Scherbel
Assistant Examiner—Caroline D. Dennison
Attorney, Agent, or Firm—Alfred E. Miller

[57] ABSTRACT

A centrifugal clutch has a clutch drum and a strip therein elastically secured to a clutch center and transfers a driving torque by servo action. During normal torque transfer the strip drives in a pushing manner with servo action. Upon overload its driving point changes onto a shoulder provided with a pressure spring and the torque transfer becomes a pulling action with no servo action.

3 Claims, 2 Drawing Sheets

CENTRIFUGAL CLUTCH

This application is a continuation of application Ser. No. 836,302, filed 3/5/86, now abandoned.

The present invention relates to a centrifugal clutch for portable, engine-driven machines, e.g. motor saws.

In known types of centrifugal clutches jaws are used having a radial play in a clutch center for free wheeling against the clutch drum. This is effected by making the jaws or parts thereof displaceable in radial or tangential slots in the clutch center or making them swingable. Such a clutch has a contact pressure between the jaws and the inside of the clutch drum that increases as the square of the r.p.m. Since a high engaging r.p.m. and a low skidding are desired, the torque transferred by the clutch at high r.p.m. will be unnecessarily great, thereby causing a high stress on all moving parts upon a sudden braking of the machine, e.g. a motor saw subjected to a so-called kickback releasing an emergency brake. Another drawback of this type of clutch is the absence of elasticity, thus unevenness in the rotation of the driving shaft, changes of the r.p.m. of the load (e.g. a saw chain), the polygonal shape of the driving wheels etc. produce torque jerks which are transferred in the machine. It is also easy to understand that in such a clutch the high momentary torque transferring is opposed to a desired restriction of the torque in the clutch.

According to the invention a centrifugal clutch is provided in which the said drawbacks are eliminated. This is achieved by the arrangement of a circular strip elastically secured to the clutch center within the clutch drum and disposed to transfer driving torque by changing from servo action to the absence of servo action as the speed increases.

Figure 2:
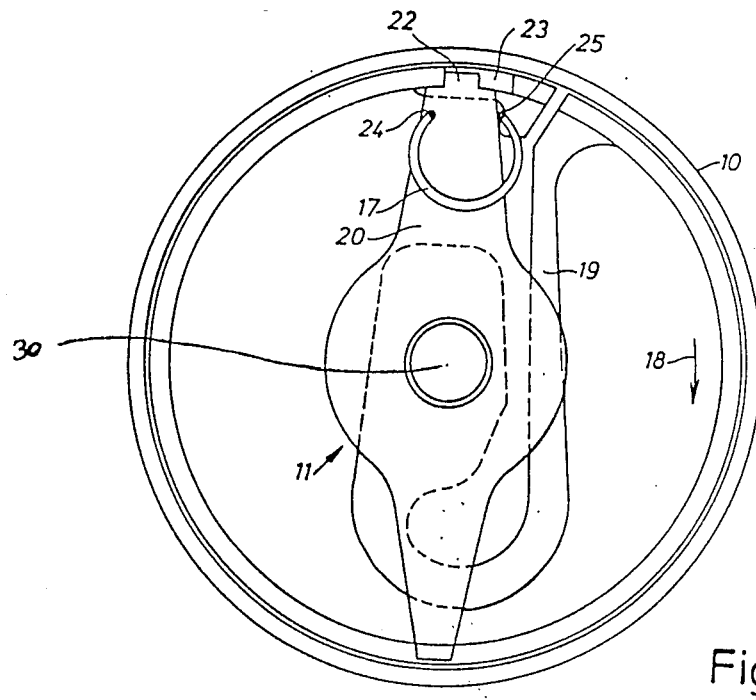
Figure 3:
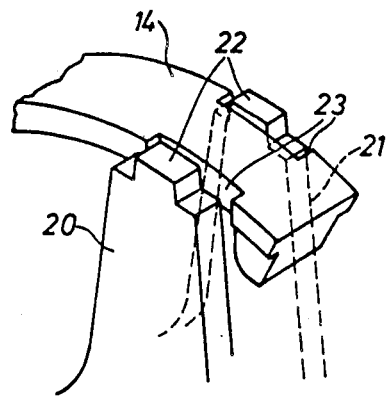
Figure 4:
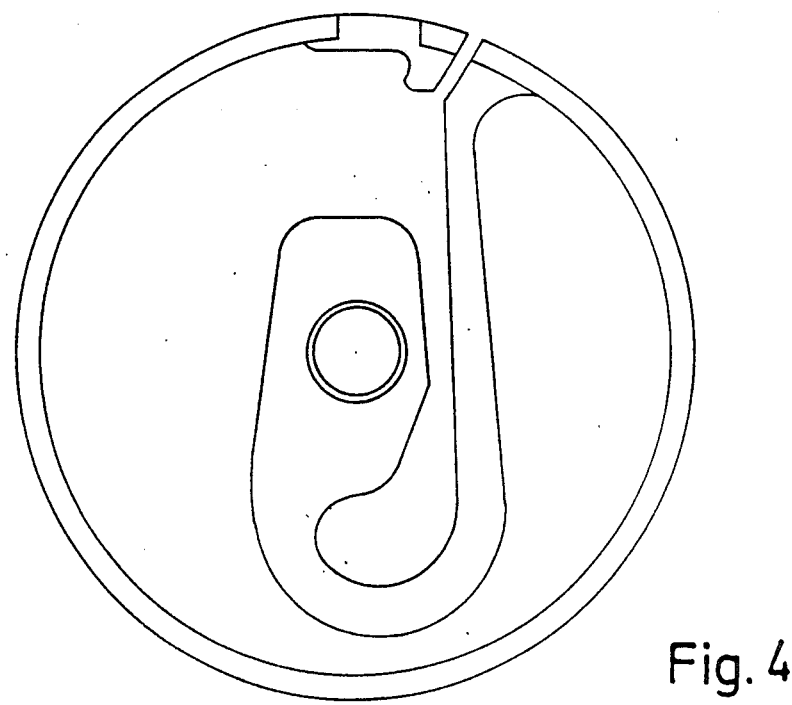

An embodiment of a clutch according to the invention will be described in the following with reference to the accompanying drawings which show in FIG. 1 a clutch in a horizontal projection,
FIG. 2 a variation of such a clutch,
FIG. 3 a detail of the clutch of FIG. 2 and
FIG. 4 a flat spring of the clutch of FIG. 2.

The complete clutch has two main parts: a driven clutch drum 10 and a clutch center 11. The drum has the shape of a bowl, in the bottom of which a hole (not shown) is provided that is penetrated by a shaft to be driven by the clutch. At rest the drum and the center (not shown) are completely separated and can be dismounted. The center has a central hole 12 which is coaxial to the hole in the bottom of the bowl and adapted to be mounted on a driving shaft 30 to the clutch.

The clutch center comprises a connecting piece 13 and a flat spring 14 secured thereto and bent centrically arcuately to have a diameter somewhat less than the inside of the drum, and a shoulder 15 which is also fastened to the connecting piece. A pressure spring 17 acts between the shoulder 15 and the free end 16 of the flat spring. When a portion 19 of the flat spring bends owing to a moment the end 16 approaches the shoulder 15, and at a predetermined magnitude of the moment a contact with the shoulder is established. During normal torque transfer from the center to the drum the flat spring drives in a pushing manner, thereby providing servo action (arrow 18), but at overload the spring changes its driving point to the shoulder 15, whereby the spring is pulled by the shoulder 15. The time of changing the driving manner is determined by the stiffness of the spring portion 19 which in case of small stiffness can be completed by the pressure spring 17. The stiffness can be predetermined by the choice of material, as an example a spring of sintered material is shown in FIG. 4 having a smaller modulus of elasticity than steel. The variation shown in FIGS. 2 and 3 is different from the one in FIG. 1 with respect to the clutch center which here is provided with plates 20, 21 on opposite sides of the flat spring 14. As shown in FIG. 3 tongues 22 of the plates project into recesses 23 of the flat spring. The tongues and the recesses have here the same working mode as the shoulder 15 and the end 16 in FIG. 1. The circular spring 17 in FIG. 2 has points of action 24, 25 on the plates and in the end 16 of the spring, respectively. The plates on each side of the flat spring are supports and position the spring centrally in relation to the clutch drum at rest, as shown in FIG. 2.

We claim:

1. In a centrifugal clutch with a driven clutch drum and a driving clutch center with a central connecting piece and at least an arcuate clutch element, the improvement wherein the clutch element comprises an elastic arcuate strip with a modulus of elasticity having a first and second end, wherein said first end is coupled to the connecting piece whereby the spring is urged toward the drum with increasing force as the speed of rotation of the driving clutch center increases, a shoulder on said connecting piece, and a spring which elastically couples said second end to said shoulder whereby said second end is positioned to exert force on said shoulder at speeds of revolution of said clutch center above a determined speed such that torque does not increase with said speed above said determined speed.

2. A centrifugal clutch according to claim 1, wherein torque is transferred to the strip by said coupling to the connecting piece at speeds below said determined speed and has a servo action against the clutch drum at said speeds below said determined speed.

3. A centrifugal clutch according to claim 2, wherein said spring, disposed between the shoulder and the second end of the strip, provides a resilient force complementing the modulus of elasticity of the strip for determining whether torque is directed to the strip by the coupling to the connecting piece or said shoulder.

* * * * *

UNITED STATES PATENT AND TRADEMARK OFFICE
CERTIFICATE OF CORRECTION

PATENT NO. : 4,813,525

DATED : March 21, 1989

INVENTOR(S) : Rangert et al.

It is certified that error appears in the above-identified patent and that said Letters Patent is hereby corrected as shown below:

On the title page, item [54], in the title delete "Centrigugal" and insert --Centrifugal--.

On the title page, under item [56] References Cited, delete "553,963" and insert --553,983--.

Column 1, line 1, delete "Centrigugual" and insert --Centrifugal--.

Column 1, line 46, after "shaft" insert --(not shown)--.

Column 1, line 48, delete "(not shown)".

Signed and Sealed this

Twenty-fourth Day of July, 1990

Attest:

HARRY F. MANBECK, JR.

*Attesting Officer*    *Commissioner of Patents and Trademarks*